United States Patent [19]

Machida et al.

[11] Patent Number: 5,137,437
[45] Date of Patent: Aug. 11, 1992

[54] SCROLL COMPRESSOR WITH IMPROVED BEARING

[75] Inventors: Shigeru Machida; Masahiro Takebayashi, both of Ibaraki; Hiroshi Iwata, Odawara; Kazuo Sekigami; Nobuo Abe, both of Tochigi; Kenji Tojo, Ibaraki; Kazuo Ikeda, Tochigi, all of Japan

[73] Assignee: Hitachi, Ltd., Tokyo, Japan

[21] Appl. No.: 638,767

[22] Filed: Jan. 8, 1991

[30] Foreign Application Priority Data

Jan. 8, 1990 [JP] Japan ................... 2-000485
Jan. 22, 1990 [JP] Japan ................... 2-010625

[51] Int. Cl.⁵ ............... F04C 18/04; F04C 29/00; F16C 23/04
[52] U.S. Cl. ............... 418/55.1; 418/55.3; 418/151; 384/209
[58] Field of Search ............... 417/423.12, 410; 418/55.1, 55.3, 55.5, 55.6, 151; 384/209

[56] References Cited

U.S. PATENT DOCUMENTS

| | | | |
|---|---|---|---|
| 1,276,613 | 8/1918 | Bergman | 384/209 |
| 4,201,521 | 5/1980 | Carlson | 417/410 |
| 4,449,891 | 5/1984 | Kemmner | 417/423.12 |
| 4,666,381 | 5/1987 | Butterworth | 418/55.6 |
| 4,834,623 | 5/1989 | Triolo et al. | 417/410 |
| 4,898,520 | 2/1990 | Nieter et al. | 418/55.1 |

FOREIGN PATENT DOCUMENTS

| | | | |
|---|---|---|---|
| 59-28088 | 2/1984 | Japan . | |
| 61-8487 | 1/1986 | Japan | 418/55.1 |
| 61-40472 | 2/1986 | Japan | 418/55.1 |
| 62-271984 | 11/1987 | Japan . | |
| 1-170779 | 7/1989 | Japan | 418/55.1 |
| 1-211680 | 8/1989 | Japan | 418/55.3 |

*Primary Examiner*—John J. Vrablik
*Attorney, Agent, or Firm*—Antonelli, Terry, Stout & Kraus

[57] ABSTRACT

A scroll compressor has an orbiting scroll which operatively meshes with a stationary scroll to define compression chambers therebetween. This orbiting scroll is driven by an electric motor through a crank-shaft, and makes an orbiting movement while being prevented from rotating about its own axis by a rotation preventing member. The crankshaft is journalled by at least two sliding bearings which are arranged respectively on the both sides of the electric motor, and the mast remotely distanced bearing from the orbiting scroll has a self-aligning function which enables it to change its attitude in accordance with any inclination of the crankshaft. Further, a balance and a counter weight are provided on the crankshaft to counterbalance the centrifugal force produced by the orbiting scroll and the inertial force produced by the rotation preventing member.

17 Claims, 6 Drawing Sheets

SCROLL COMPRESSOR WITH IMPROVED BEARING

BACKGROUND OF THE INVENTION

The present invention relates to a scroll compressor, and in particular, to an improvement in connection with a bearing and a balance weight that is advantageous in enhancing the reliability of and in reducing the vibration of a scroll compressor. Such a scroll compressor is used, though not exclusively, for refrigeration and air conditioning, and is preferably of a closed or hermetic type.

A conventional scroll compressor has a stationary and an orbiting scroll, each having a spiral wrap. These scrolls are meshed with respect to each other to define a plurality of compression chambers therebetween. An intake port is provided in the outer periphery of the stationary scroll, and a discharge port in the vicinity of the center of the same. Accordingly, as the orbiting scroll is making an orbiting movement, these compression chambers decrease their volumes gradually from the outer periphery of the stationary scroll towards the center thereof. As a result, a working gas, which has been sucked through the intake port and confined in these compression chambers, is gradually compressed to be discharged through the discharge port as high pressure gas.

Further, an electric motor for driving is provided close to the orbiting scroll, and a crankshaft, which is jointed to the rotor of this motor, is connected to the orbiting scroll. This crankshaft is rotatably supported by sliding bearings arranged respectively on both sides of the motor.

A scroll compressor structure as described above is shown, for instance, in Japanese Patent Laid-Open No. 59-28088. This known type of scroll compressor is of a hermetic type, wherein the bearing which is situated below the motor is mounted on a bottom plate which is separate from a compressor shell. Lubricating oil is forcibly supplied to each bearing from the outside of the compressor through this bottom plate.

Further, in a compressor of this type, since the orbiting scroll makes an orbiting movement along a fixed orbit, a large unbalance force results and is applied to the driving crankshaft. In view of this, the crankshaft is provided with a balance weight to cope with this unbalance force. Such a balance weight is shown, for example, in the above-mentioned publication as well as Japanese Patent Laid Open No. 62-271984.

SUMMARY OF THE INVENTION

As stated above, according to the known structure of Japanese Patent Laid-Open No. 59-28088, the bearing which is situated below the motor is mounted on a bearing housing which serves as the bottom plate. The bearing housing is positioned with respect to a hermetic container by means of fit or male-female portions and is fixed thereto by bolts. To accurately effect this positioning, the manufacture of the compressor has to be made with a high precision in positioning of holes for bolt insertion in an outer peripheral flange section of the bottom plate and in machining of the fit portions. In addition, when assembling the compressor, the center of the crankshaft and that of the bearing which is below the motor must be aligned with each other carefully, thereby resulting in rather poor productivity.

Furthermore, when the scroll compressor is operated, the crankshaft is subjected to centrifugal forces of the orbiting scroll and the balance weight, an electromagnetic attracting force resulting from unevenness in a gap between a stator of the motor and the rotor thereof, etc. Such external forces may cause the crankshaft to be deformed in a complicated manner. In most types of scroll compressors, including in the conventional type structure described above, an upper portion of the crankshaft, i.e., the portion thereof which is above the motor and on the side of the orbiting scroll with respect thereto, is made relatively thick so that the deformation of the crankshaft is larger in amount at that portion thereof below the motor. As a result, local contact is caused in the bearings, which are arranged respectively on the both sides of the motor, because of the deformation of the driving shaft or crankshaft, with the result that the reliability of the bearings is deteriorated.

In addition, conventional balance and counter weights are provided with a view to counterbalancing the centrifugal force generated as a result of the orbiting movement of the orbiting scroll. In other words, no consideration is given to the influence of other forces resulting from movements of other components, such as a rotation preventing mechanism, on the vibration of the entire scroll compressor. Thus, there is, for example, the problem that an inertial force resulting from the movement of the rotation preventing member increases the vibration of the compressor. Moreover, no sufficient consideration has been given up time concerning, to the present for example, the case in which the compressor is operated at different speeds of rotation. In particular, when the compressor is operated at a high speed of more than 60 Hz, the vibration caused by the unbalance mass of the rotation preventing member occurs to an excessive degree, and this rotation preventing member constitutes the main vibration source of the compressor.

It is accordingly an object of the present invention to provide a scroll compressor which is easy to assemble and whose bearings involve no local contact, thus providing a high level of reliability.

Another object of the invention is to provide a scroll compressor with bearings which involve no local contact even if a driving shaft is deformed.

The invention has still another object of providing a scroll compressor which operates with less vibration even when operating at a high speed.

A further object of the invention is to provide a scroll compressor with components which can counterbalance not only the centrifugal force of an orbiting scroll but also the inertial force of a rotation preventing member.

To attain the above objects, in accordance with the invention, a plane or sliding bearing having a self-aligning function is disposed on a side of a motor, remote from an orbiting scroll, to support a lower end portion of a crankshaft. The sliding bearing is adapted to incline in a bearing housing in accordance with any inclination or deformation of the crankshaft, thereby preventing local contact of bearings. This self-aligning type sliding bearing is preferably formed such that its inner and outer peripheries have a cylindrical and a spherical configuration, respectively. Further, a balance weight and a counter weight are attached to the crankshaft. These weights are designed taking into account not only the centrifugal force of the orbiting scroll but also the inertial force of a rotation preventing member.

According to an aspect of the invention, the scroll compressor comprises: a stationary and orbiting scroll each having a spiral wrap, the respective spiral wraps of these scrolls are such that they form a meshing arrangement with each other to form compression chambers therebetween; a driving means for driving the orbiting scroll; a crankshaft means for operatively connecting the driving means to the orbiting scroll, thereby causing the orbiting scroll to make an orbiting movement; and at least two bearing means respectively disposed on both sides of the driving means for rotatably journaling the crankshaft means. The bearing means which is the most remotely distanced one from the orbiting scroll has a self-aligning function of enabling that bearing means to change its attitude in accordance with any inclination of the crankshaft means.

Further, the stationary scroll and the driving means are mounted to a common casing. The bearing means most remotely distanced from the orbiting scroll is mounted to a separate bearing housing from the casing, and is fixed to the casing through the bearing housing.

Furthermore, the orbiting means, in order to prevent rotation thereof about its own axis, is operatively engaged with a rotation preventing means. The crankshaft means is in engagement with a weight means which provides a counternailling force to the external forces acting on the crankshaft. This weight means is provided such that it copes with the centrifugal force of the orbiting scroll and the inertial force of the rotation preventing means.

It is preferable that the bearing means most remotely distanced from the orbiting scroll comprises a sliding bearing which has a spherical outer periphery rotatably supported by a bearing holder. The rotation preventing means preferably comprises an Oldham ring-and the weight means preferably comprises a balance and a counter weight. It is preferable for these balance weight and counter weights to be formed and arranged such that the balance weight has an unbalance mass which is the sum of an unbalance mass for generating a centrifugal force substantially equal to the centrifugal force caused by the orbiting movement of the orbiting scroll and an unbalance mass for generating a centrifugal force substantially equal to the average of reciprocative inertial forces caused by the reciprocating movement of the Oldham ring, and that the counter weight has an unbalance mass for counterbalancing the centrifugal force caused by the unbalance mass of the balance weight. In this case, the Oldham ring may be formed of a material which is smaller in specific weight than the material of the orbiting scroll, so that the vibration of the scroll compressor caused by the reciprocative inertial forces of the Oldham ring may be reduced in level.

Moreover, the casing may be made to define a hermetic container in which the scroll compressor is received. In this case, one end of the crankshaft is immersed in lubricating oil which is stored in the hermetic container. The lubricating oil is supplied by a self-recirculation system which utilizes a pressure difference between a working gas acting on the upper portion of the crankshaft and that acting on the lower portion of the same. That is, by this pressure difference, the lubricating oil passes through an oil passage which is formed through the crankshaft, and is supplied to each bearing. The lubricating oil thus supplied, after being used for lubrication, returns to an oil sump in the hermetic container to be used again for lubrication.

In the structure stated above, thanks to the self-aligning function of that bearing which is most remotely distanced from the orbiting scroll, a satisfactory bearing condition without involving any local contact is maintained even in the case where an assembly error occurs, such as when assembling the compressor, and which results in some misalignment between the axis of the crankshaft and that of the casing. Accordingly, the bearings are lubricated in a satisfactory manner so that they provide a higher level of reliability and, at the same time, the friction loss generated in the bearings is reduced, thereby improving the energy efficiency of the entire compressor.

In the case where the driving means comprises an electric motor, the provision of a self-aligning bearing enables a proper air gap to be always maintained between the stator and rotor of the motor. As a result, the loss of the electromagnetic torque is reduced, thereby enhancing the efficiency of the compressor.

BRIEF DESCRIPTION OF THE DRAWINGS

FIGS. 1 to 8 show scroll compressors in accordance with embodiments of the invention, in which:

FIG. 1 is a sectional view of a hermetic scroll compressor in accordance with a first embodiment of this invention, which is for explaining the general structure of the scroll compressor according to the invention;

FIG. 2 is a sectional view of a vertical-type hermetic scroll compressor in accordance with a second embodiment of the invention;

FIG. 3 is a sectional view of a horizontal-type hermetic scroll compressor in accordance with a third embodiment of the invention;

FIG. 4 is a sectional view of a vertical-type hermetic scroll compressor in accordance with a fourth embodiment of the invention;

FIG. 5 is a perspective view showing a balance weight in the compressor of the fourth embodiment in an enlarged scale;

FIG. 6 is a perspective view showing an Oldham ring in the compressor of the fourth embodiment in an enlarged scale;

FIG. 7 is a schematic view showing the vibration level and the vibration mode in the scroll compressor of the invention as compared to those in a conventional scroll compressor; and FIG. 8 is a chart showing the relationship between the speed and the vibration level in the scroll compressor of the invention as compared to that in a conventional scroll compressor.

DETAILED DESCRIPTION OF THE PREFERRED EMBODIMENTS

Hereinafter, the invention will be described on the basis of the embodiments thereof with reference to the accompanying drawings.

At the outset, with reference to FIG. 1, the general structure of a hermetic type scroll compressor to which the invention has been applied will be described. Incidentally, the scroll compressor of the invention may be of a similar structure to that of a conventional scroll compressor except for a lower bearing portion, a balance weight, and a counter weight. Therefore, description on the structural portions which may be identical to those of a conventional scroll compressor will be made briefly.

Figure 1:
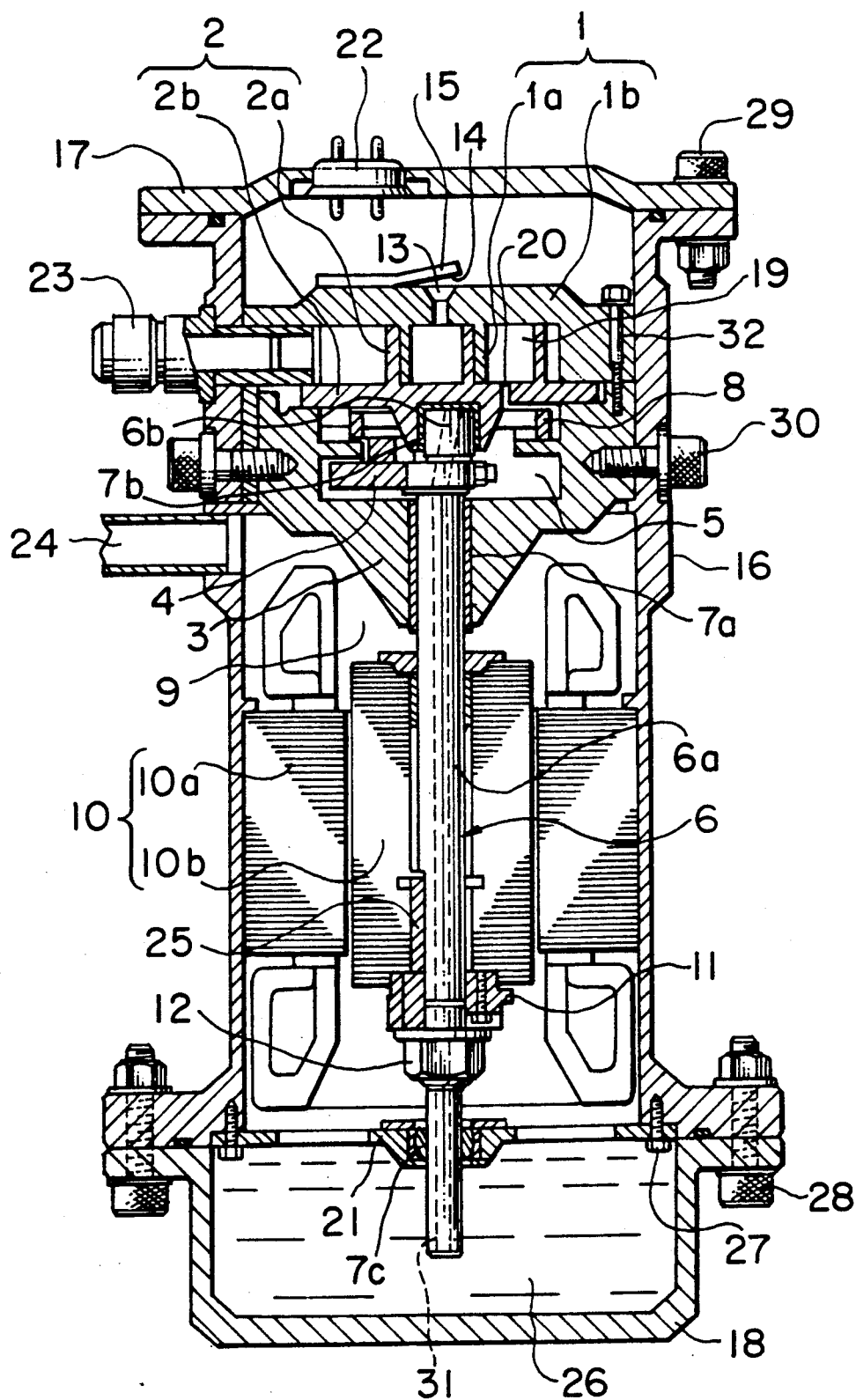

The compressor shown in FIG. 1 has a substantially cylindrical casing 16, a cover casing 17, and a bottom casing 18. The cover and bottom casings 17 and 18 are attached to the casing 16 by means of bolts 29 and 28, respectively, to close the upper and the lower openings of the casing 16, thereby forming a closed or hermetic container. This hermetic container houses a motor 10, a compression mechanism section, which is composed of a stationary scroll 1, an orbiting scroll 2, etc., and lubricating oil.

The motor 10 is situated at a position substantially in the middle of the height (or axial length) of the hermetic container, and is composed of a stator 10a, which is fixed in the casing 16, and a rotor 10b, which is rotatable within the stator. A crankshaft 6 extends through the rotor 10b. Arranged between the rotor 10b and the crankshaft 6 is a key 25, which serves to transmit the rotation torque of the motor 10 to the crankshaft 6. The crankshaft 6 is fixed to the rotor 10b of the motor by means of a lock nut 12.

The crankshaft 6 is composed of a linear portion 6a and another portion which is eccentric with respect to this linear section 6a, or a crank portion 6b. Formed in the crankshaft 6 is an oil passage 31, which extends through the crankshaft from end to end. The crankshaft 6 is journalled by a main bearing (consisting of a sliding bearing) 7a, which is provided in a frame 3, and a self-aligning bearing (also consisting of a sliding bearing) 7c, which is provided in a lower bearing housing 21. Further, in order to balance the rotating components during operation, the crankshaft 6 is provided with a balance weight 4, which is situated on the upper portion of the crankshaft, and a counter weight 11, which is situated on another portion of the crankshaft which is below the motor 10. These weights will be described later in more detail.

The above-described lower bearing housing 21 is disposed inside the bottom casing 18, and is attached to the lower end of the casing 16 by means of bolts 27. The lower bearing housing 21 is a disc-like member and has at its center a bearing portion, to which the sliding bearing 7c is mounted. The bearing 7c is of a self-aligning type with a spherical outer periphery, and is adapted to be variable in its attitude in accordance with any deformation or inclination of the crankshaft 6. This bearing portion will also be described later in more detail.

The frame 3 is situated above the motor 10, and is fixed to the casing 16 by means of a plurality of bolts 30 which are provided on the periphery of the hermetic container. The upper side of the frame 3 is formed with a recess, in which an Oldham ring 8 for preventing the rotation of the orbiting scroll 2 about its own axis is slidably provided. The orbiting scroll 2 is stituated above the frame 3 and covers the recess of the frame to define a back pressure chamber 5. The Oldham ring 8 is placed in a sandwiched manner between the frame 3 and the orbiting scroll 2, and, as will be described later in detail in connection with another embodiment, is formed at its portions with protrusions which project therefrom in opposite directions, respectively. These protrusions are respectively in slidable engagement with grooves which are formed in the frame 3 and in the rear face of the orbiting scroll 2, respectively. The engagement portion between the lower protrusions of the Oldham ring 8 and the frame 3 is arranged perpendicular to the engagement portion between the upper protrusions of the Oldham ring 8 and the orbiting scroll 2.

Formed on the back or rear side of the orbiting scroll 2 is a bearing portion 7b having a substantially inverted cup-like configuration, with which the crank portion 6b of the crankshaft 6 is drivingly in engagement. The orbiting scroll 2 is composed of a substantially disc-like end plate 2b and a spiral wrap 2a fixed to this end plate. Likewise, the stationary scroll 1 is composed of a spiral wrap 1a and an end plate 1b. The stationary scroll 1 is fixed to the frame 3 by means of bolts 32 with the wrap 1a being meshed with the wrap 2a of the orbiting scroll 2 to define, together with the orbiting scroll 2, a plurality of compression chambers 19. These compression chambers 19 and the back pressure chamber 5 communicate with each other through an intermediate pressure hole 20 which is formed in the end plate 2b of the orbiting scroll 2. In order that the orbiting scroll 2 may move smoothly while engaging the stationary scroll 1, the former is held at the outer periphery of its end plate 2b between the frame 3 and the outer periphery of the stationary scroll 1. In the stationary scroll 1, an intake port 23 is formed in the outer periphery thereof, and a discharge port 13 is formed in the center of the stationary scroll 1. Further, provided on the upper surface of the stationary scroll 1 is a check valve 14 and a retainer 15, which are arranged so as to confront the discharge port 13.

Subsequently, the operation of the scroll compressor of the embodiment, constructed as above, will be described.

The supply of electric power to the motor 10 is done through a hermetic terminal 22 which is provided in the cover casing 17. This hermetic terminal 22 is electrically connected to coils of the motor through lead wires, although these wires are not shown in the drawing. When the electric power is supplied to the motor 10 from the outside, the motor rotor 10b rotates to rotatively drive the crankshaft 6. As a result, the orbiting scroll 2 makes an orbiting movement owing to the presence of the Oldham ring 8. Then, a working gas flows into the compressor through the intake port 23 and is successively confined in the compression chambers 19. The working gas in each compression chamber 19 is gradually compressed as the orbiting scroll 2 is making the orbiting movement, and is discharged as high pressure gas through the discharge port 13 located in the center of the stationary scroll 1.

During the above compression operation, the working gas in the compression chambers 19, whose pressure has been raised to an appropriate intermediate pressure, flows through the intermediate pressure hole 20 and fills the back pressure chamber 5. As a result, the gas pressure in the back pressure chamber 5 generates a thrust force, which will push up the orbiting stroll 2. This thrust force is set larger than the total downward thrust force generated by the pressure of the working gas in the compression chambers 19. Accordingly, during the operation, the orbiting scroll 2 is always pressed against the stationary scroll 1, thus allowing the compressing operation to be performed in a stable manner.

The high pressure gas discharged through the discharge port 13 flows through a passage (not shown) provided between the casing 16 and the compression mechanism section and enters a motor chamber 9. In this motor chamber, the high pressure gas is separated from lubricating oil and flows out of the compressor through a discharge pipe 24 provided in the casing 16. On the other hand, the lubricating oil separated from the high pressure gas flows downwards by gravity and reaches an oil sump 26. The lower end of the crankshaft 6 is immersed in the lubricating oil of the oil sump. The lubricating oil in the oil sump 26 is under the high pressure prevailing in the hermetic container, and the intermediate pressure in the back pressure chamber 5 acts on the end of the oil passage 31. Thus, while the compressor is in operation, the difference between these pressures causes the lubricating oil in the oil sump 26 to be supplied to each bearing portion 7 through the oil passage 31. The oil which has been used for lubricating the bearing portions 7a and 7b is discharged into the back pressure chamber 5 and flows through the intermediate pressure hole 20 to enter the compression chambers 19. Afterwards, the lubricating oil is discharged through the discharge port 13 along with the high pressure gas and returns to the oil sump 26 again.

The check valve 14 and the retainer 15, provided to confront the discharge port 13, prevent the high pressure gas in the hermetic container from flowing backwards into the compression chambers 19 when the compressor is at rest or when the maximum pressure in the compression chambers 19 is lower than the pressure of the high pressure gas in the hermetic container.

Next, the lower bearing portion will be described in detail with reference to the embodiment shown in FIG. 2. The basic structure and the compressing operation of the embodiments which will be described hereinafter are the same as those of the first embodiment described above. Thus, in the following, components which are identical to those of the first embodiment will be designated by the same reference numerals, and only components which are different from those of the first embodiment will be described.

Figure 2:
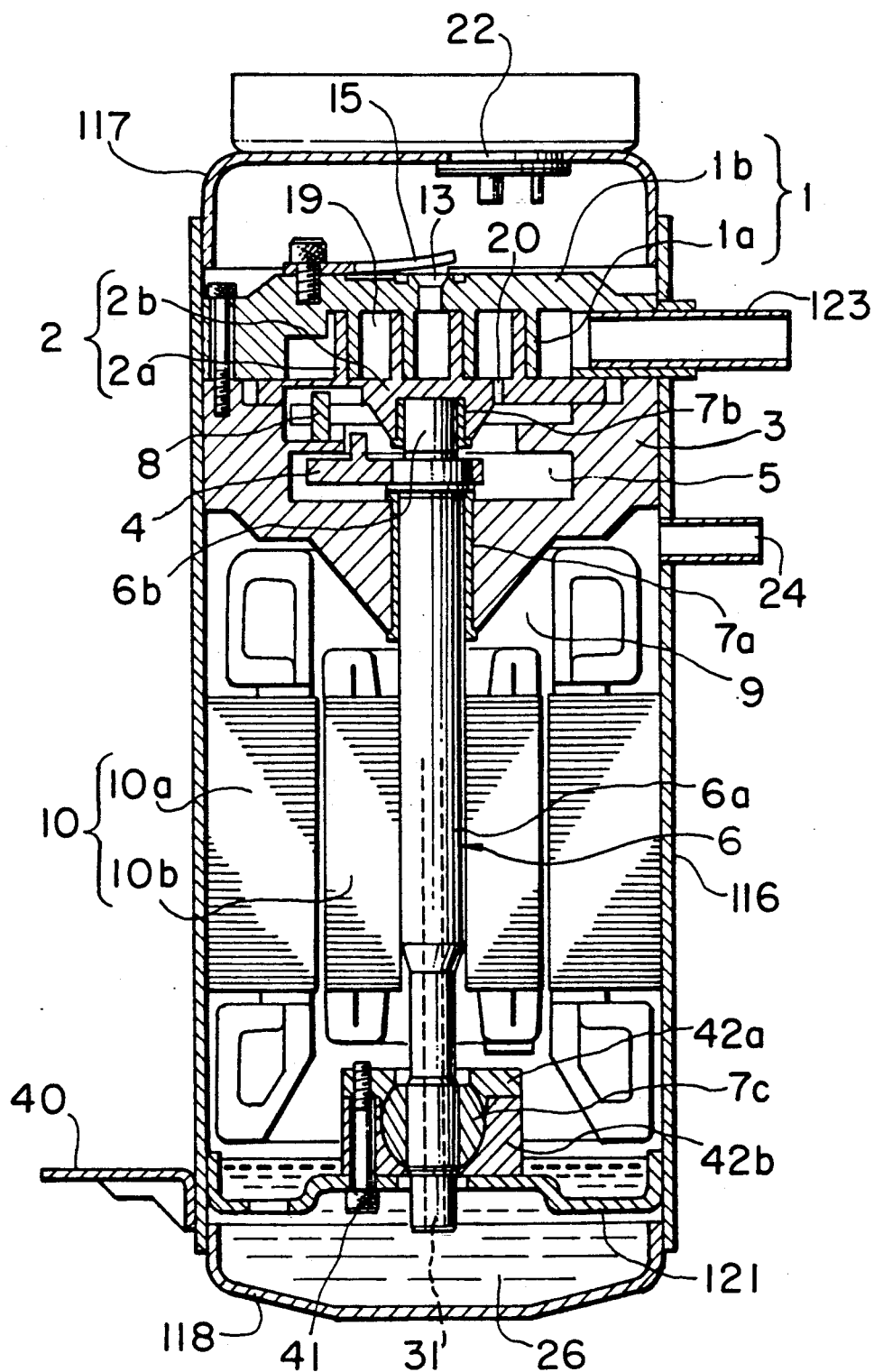

The hermetic-type scroll compressor shown in FIG. 2 has a cylindrical casing 116, and a top and a bottom casing 117 and 118 are respectively welded to the upper and the lower ends of the casing 116, thereby forming a hermetic container. Further, an intake pipe 123 is press-fitted through the casing 116 to extend up to the scroll 1, and is welded to the casing 116 to keep the airtightness. The frame 3, supporting the components of the compression mechanism section, etc. is fixed to the casing 116.

The rotor 10b of the motor is also attached to the crankshaft 6a by such means as press fitting or the like. The spherical bearing 7c having a self-aligning function is provided at the lower end of the crankshaft 6 and is positioned by means of bearing holders 42a and 42b. These bearing holders define a spherical inner surface for receiving the spherical bearing 7c, and are attached to a lower bearing housing 121 by a plurality of bolts 41. Inside the bottom casing 118, the lower bearing housing 121 is fixed to the lower end of the casing 116 by means of welding or the like. Further, a plurality of supporting legs 40 are attached to the periphery of the casing 116, and serve as a support for the vertical-type compressor.

Subsequently, the assembling procedure and the operation of the spherical bearing 7c according to this embodiment, which has a self-aligning function, will be described.

When assembling the compressor, the motor stator 10a is first fixed in the casing 116. Then, the crankshaft 6 is mounted on the frame 3, and the motor rotor 10b is attached to the crankshaft 6. The thus assembled structure is inserted into the casing 116 from above, fixing the outer periphery of the frame 3 to the casing 116. Thus, the frame 3, the motor 10, and the crankshaft 6 are positioned in place.

In this condition, however, the casing 116 and the crankshaft 6 are not always in axial alignment with each other, since machining and assembly errors, etc. may have resulted. Even in the case of such misalignment, with the provision of the spherical bearing 7c having a self-aligning function, the bearing is capable of sliding so as to appropriately change its attitude in accordance with an inclination of the crankshaft. Accordingly, the spherical bearing 7c can be set in the correct position, with its inner surface not being in local contact with the crankshaft 6. After being set to the crankshaft 6, the spherical bearing 7c having a self-aligning function is attached to the lower bearing housing 121 by tightening a clamping bolt 41 through the intermediation of the bearing holders 42a and 42b. By tightening this clamping bolt, the inner surface of the bearing holders 42a and 42b and the outer surface of the spherical bearing 7c become fitted with each other in a satisfactory manner. Thus, if, during the operation, the crankshaft 6 is deformed or inclined by the forces acting on it, the spherical bearing 7c rotates slightly with respect to the bearing holders in accordance with the inclination of the crankshaft. Accordingly, the spherical bearing 7c can continue to be in its form of a satisfactory sliding bearing for the crankshaft 6, without involving any local contact therewith.

Figure 3:
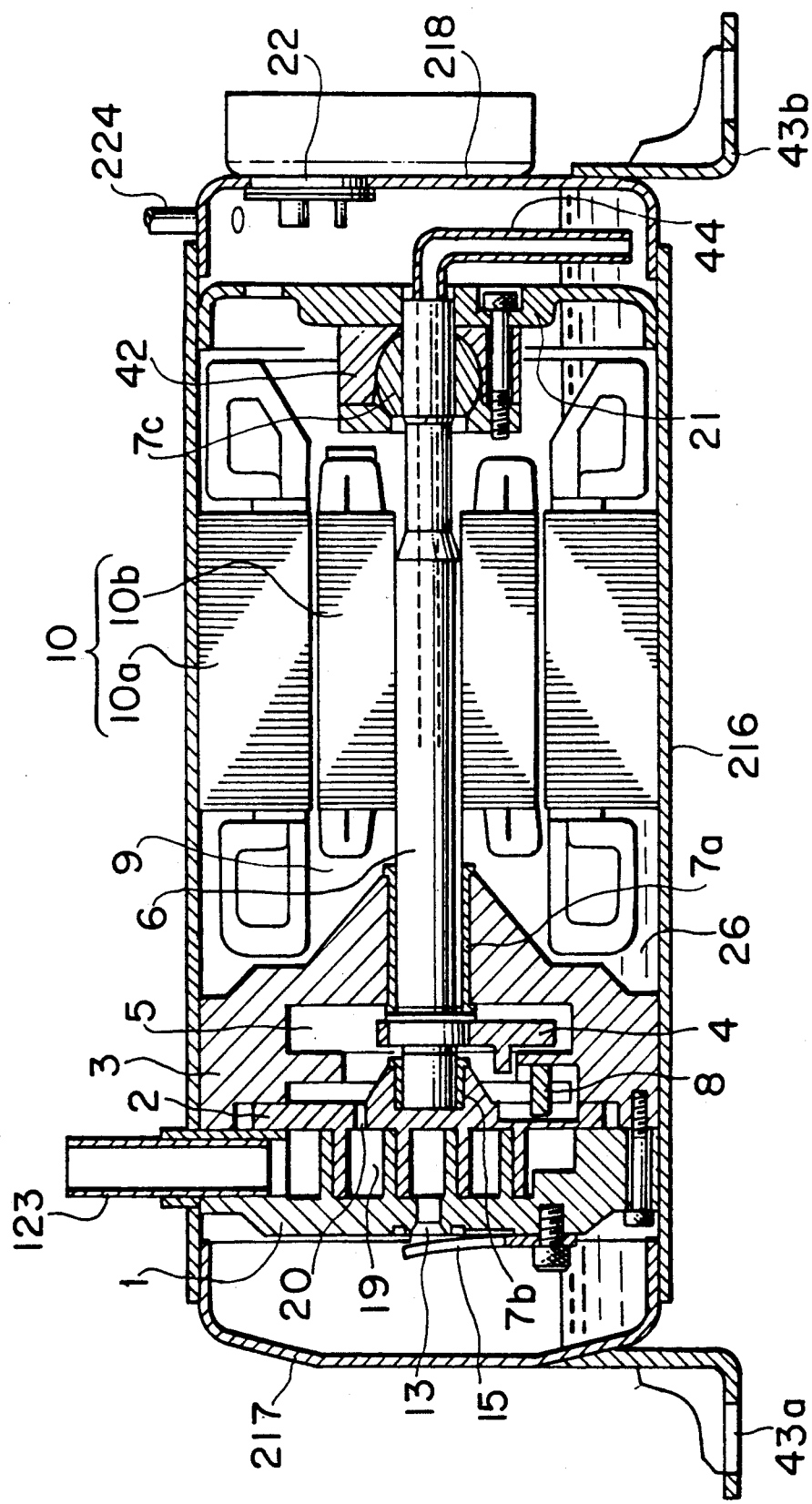

Referring to FIG. 3, the hermetic type scroll compressor according to the third embodiment of the invention has a structure similar to that of the second embodiment, with its crankshaft 6 being supported by the bearing 7a and the self-aligning type spherical bearing 7c, which are respectively arranged on each side of the motor 10. The compressor of this embodiment, however, is of a horizontal type, in which an oil pipe 44 is attached to one end of the crankshaft 6, thus connecting the oil passage of the crankshaft to the lubricating oil in the oil sump 26.

The hermetic container 5 of this compressor, likewise as in the second embodiment, is formed by attaching cover casings 217 and 218 respectively to each end of a cylindrical casing 216 by means of welding or the like. A high pressure gas discharge pipe 224, however, is not attached to the casing 216 but to the cover casing 218 which is situated on the side of the spherical bearing 7c. The hermetic terminal 22 is also provided in this cover casing 218. Further, supporting legs 43a and 43b are attached to the cover casings 217 and 218, respectively, serving as a support for the horizontal-type compressor.

As in the above-described embodiments, the intermediate pressure hole 20 keeps the pressure in the back pressure chamber 5 at a level which is intermediate that between the intake pressure and the discharge pressure of the compressor. The difference between this intermediate pressure and the discharge pressure enables the lubricating oil to be supplied to each of the sliding bearings 7 through the oil pipe 44 and the oil passage of the crankshaft. The oil which has been used for lubricating the bearings 7a and 7b is discharged into the back pressure chamber 5. Afterwards, it flows through the intermediate pressure hole 20, etc. and enters the compression chambers 19. Then, the oil is discharged through the discharge port 13 and returns to the oil sump 26. The working gas, on the other hand, is sucked through the intake pipe 123 and is discharged through the discharge port 13 as high pressure gas, which flows through the discharge pipe 224 to the cycle piping of an air conditioner (not shown).

In the compressor constructed as above, the provision of the spherical bearing 7c having a self-aligning function is particularly important. The spherical bearing 7c can avoid local contact, and, at the same time, support the crankshaft 6 in such a manner that an appropriate gap is always retained between the stator 10a and the rotor 10b.

Figure 4:
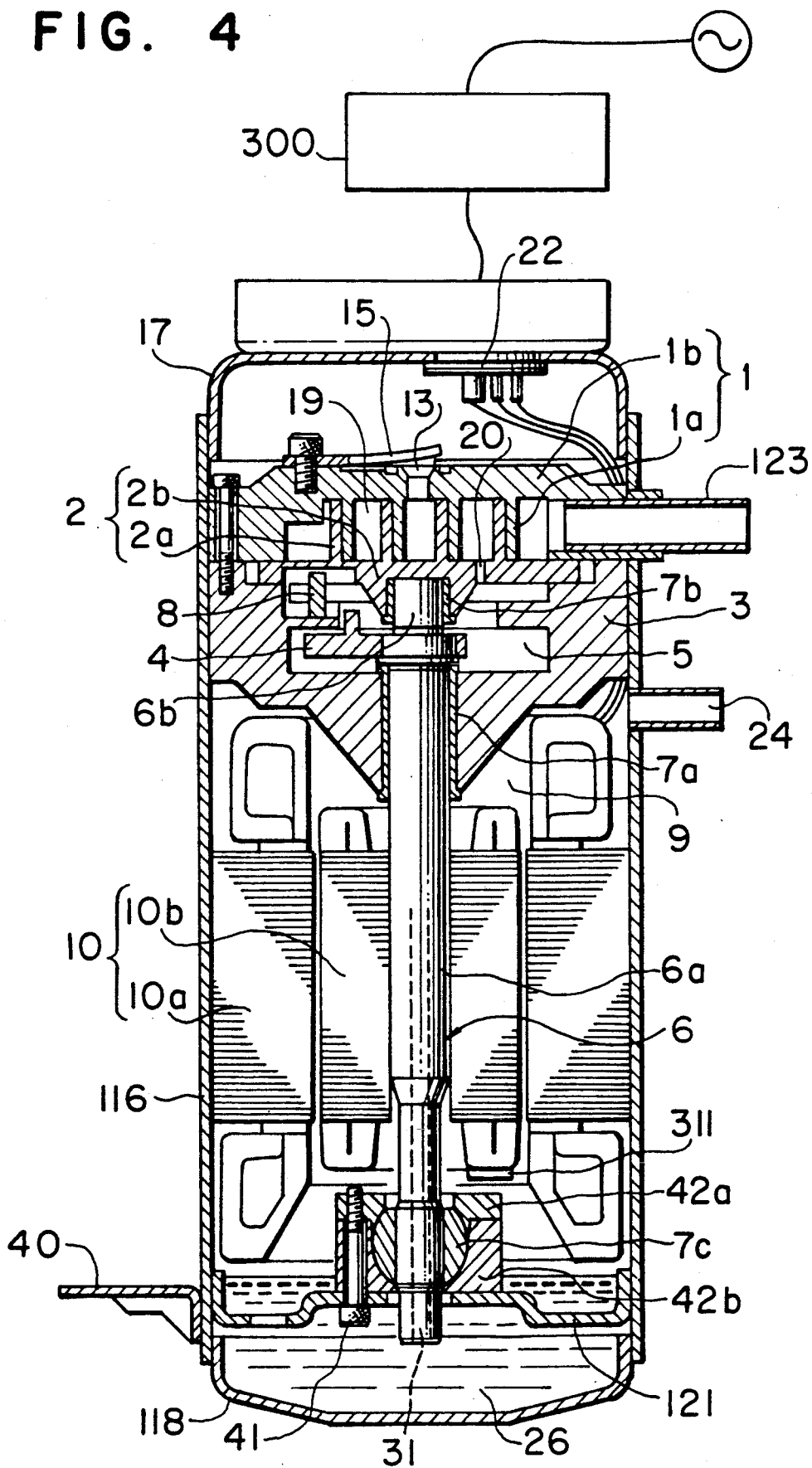

Next, the balance and the counter weights of the invention will be described in detail with reference to the scroll compressor of the fourth embodiment shown in FIG. 4.

The hermetic scroll compressor of this embodiment is of a vertical type, whose basic structure is similar to that of the embodiment shown in FIG. 2. In this compressor, the motor 10 is connected to the electric power source through a frequency converting control device 300 so that it may be operated at different speeds. The balance weight 4 is attached to an upper portion of the crankshaft 6 between the bearings 7a and 7b, and is in the shape of being rotatable in the intermediate pressure chamber 5. Further, a counter weight 311 is provided on the lower end surface of the rotor 10b so as to be opposite the balance weight.

Figure 5:
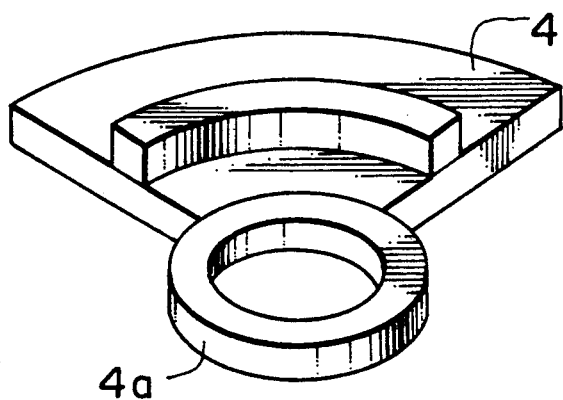

As shown in FIG. 5, the balance weight 4 is composed of a cylindrical portion 4a and a fan-shaped portion radially extending therefrom. The balance weight 4 is fixed to the crankshaft 6 with the crankshaft inserted through this cylindrical portion. The counter weight 311 is of such a shape that it constitutes a part of a ring, though not shown in the drawing. These balance and counter weights 4 and 311 are designed such that they provide an unbalance mass which is cable of producing a centrifugal force approximately equal to the sum of the centrifugal force produced by the orbiting movement of the orbiting scroll 2 and an inertial force that is half the maximum inertial force produced when the Oldham ring 8 makes a reciprocating movement, i.e., the average of the reciprocative inertial forces. In other words, the weights 4 and 311 are formed such that the condition of equilibrium is satisfied taking into account all the factors on the datum of the crankshaft 6, inclusive of the centrifugal force of the orbiting scroll 2 acting on the crankshaft 6 and the point of application thereof, the average inertial force of the Oldham ring 8 and the point of application thereof, the centrifugal force of the balance weight 4 and the point of application thereof, the centrifugal force of the counter weight 311 and the point of application thereof, etc.

Figure 6:
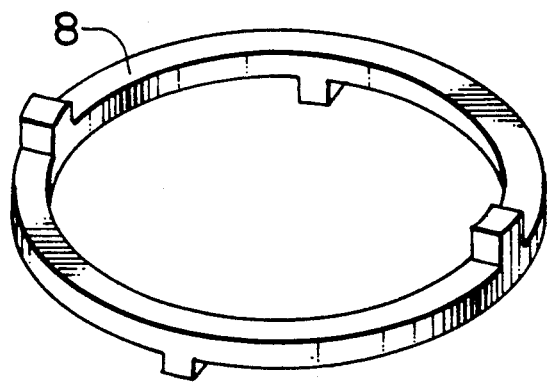

The Oldham ring 8, which serves to prevent the orbiting scroll 2 from rotating about its own axis, is provided inside the frame 3 to be slidable in one direction. The orbiting scroll 2 is supported on the frame 3, and its rear side is in engagement with the Oldham ring 8. As shown in FIG. 6, the Oldham ring 8 is of a structure in which a pair of protrusions is formed on each side of the ring. The protrusions of each pair are arranged opposite to each other along an imaginary line passing through the ring center. Further, one pair of protrusions are shifted or offset 90 degrees from the other pair. The Oldham ring 8 is adapted to prevent the orbiting scroll 2 from rotating about its own axis by slidably engaging one pair of protrusions with a groove provided in the rear side of the orbiting scroll 2 and the other pair of protrusions with a groove provided in the frame 3.

Further, the Oldham ring 8 is designed so as to be of a lower weight as compared with a conventional Oldham ring. To this end, the Oldham ring 8 is formed of an aluminum alloy. In this case, since the protrusions of the Oldham ring 8 engage with the orbiting scroll 2 and slides thereon, the orbiting scroll 2 is preferably formed of an iron-system material, in particular, cast iron, in view of the reliability in sliding. It goes without saying that, with respect to the portion of the frame 3 which engages with the Oldham ring, i.e., the groove portion of the frame, the same material as that of the orbiting scroll 2 may be used.

Figure 7:
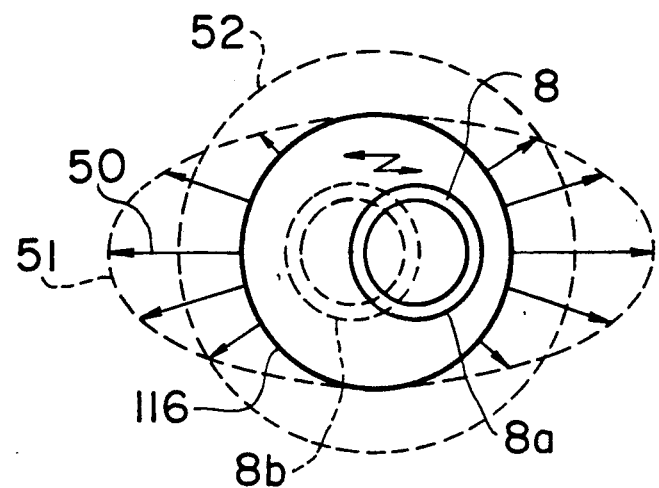

Referring now to FIG. 7, the effect of the improvement in the above-described balance and counter weights will be described.

FIG. 7 shows the movement of the Oldham ring 8 in the casing 116. Further, the drawing schematically shows the mode of vibration of the scroll compressor according to the invention and that of a scroll compressor according to the conventional art, in terms of vectors around the casing 116. During the operation of each compressor, the Oldham ring 8 reciprocates between its positions denoted by 8a and 8b, as shown in the drawing. As a result of this reciprocation, vibration is produced in each scroll compressor and that in the conventional compressor, such vibration may be represented by vectors 50. The envelope of the vectors 50 at this time is oval, as shown in the drawing. The mode shown in FIG. 7 represents, in an extremely simple form, the vibration when the conventional scroll compressor is operated at a high speed, and the vibration is at its maximum in the direction in which the Oldham ring 8 moves. In the compressor of this invention, in contrast, in which the balance and counter weights are arranged as described above, the maximum vibration level is reduced by half as compared to that in the conventional compressor, as indicated by the envelope 52 of vibration vectors. Further, as a result of employing an Oldham ring 8 of a lower weight, the vibration vector envelope 52, which is of a circular configuration, generally becomes even smaller.

The scroll compressor of the fourth embodiment operates as described below.

First, the electric power is supplied to the frequency converting control device 300 to be set to a predetermined frequency. After the setting, the electric power is applied to the motor 10 through the hermetic terminal 22. Then, the motor 10 rotates at a speed corresponding to the frequency thus set. As the motor 10 rotates, the crankshaft 6 rotates, causing the orbiting scroll 2 to move. The orbiting scroll 2, which is prevented from rotating about its own axis by the Oldham ring 8, makes an orbiting movement along a fixed circular orbit. As a result, the working gas flows through the intake pipe 123 and enters the compression chambers 19, where it is compressed to high pressure and is discharged through the discharge port 13 at the center of the stationary scroll 1. The high pressure gas accumulated in the upper space of the hermetic container flows through the passages (not shown) provided in the outer peripheries of the stationary scroll 1 and the frame 3, and reaches the motor chamber 9 in the lower portion of the hermetic container. In the motor chamber 9, the high pressure gas and the lubricating oil mixed therewith are separated from each other, the lubricating oil flowing downwards to the oil sump 26 and the high pressure gas being discharged through the discharge pipe 24. The high pressure gas which has left the compressor is fed to an air conditioning cycle (not shown), where is undergoes heat exchange and returns to the intake pipe 123 again as low pressure gas.

In this embodiment, the operating speed of the scroll compressor can be varied arbitrarily within a certain range by virtue of the frequency converting control device 300. Moreover, the vibration of the scroll compressor is kept at a low level at any operating speed due to the effect of the balance and counter weights 4 and 311 as well as the effect of the lightweight Oldham ring 8. Although this embodiment adopts both of the two structural features, namely the improvement of the balance and counter weights 4 and 311 and the weight reduction of the Oldham ring 8, it is also possible to use only one of these features to obtain a scroll compressor with a lower level of vibration as compared to that of a conventional scroll compressor.

Figure 8:
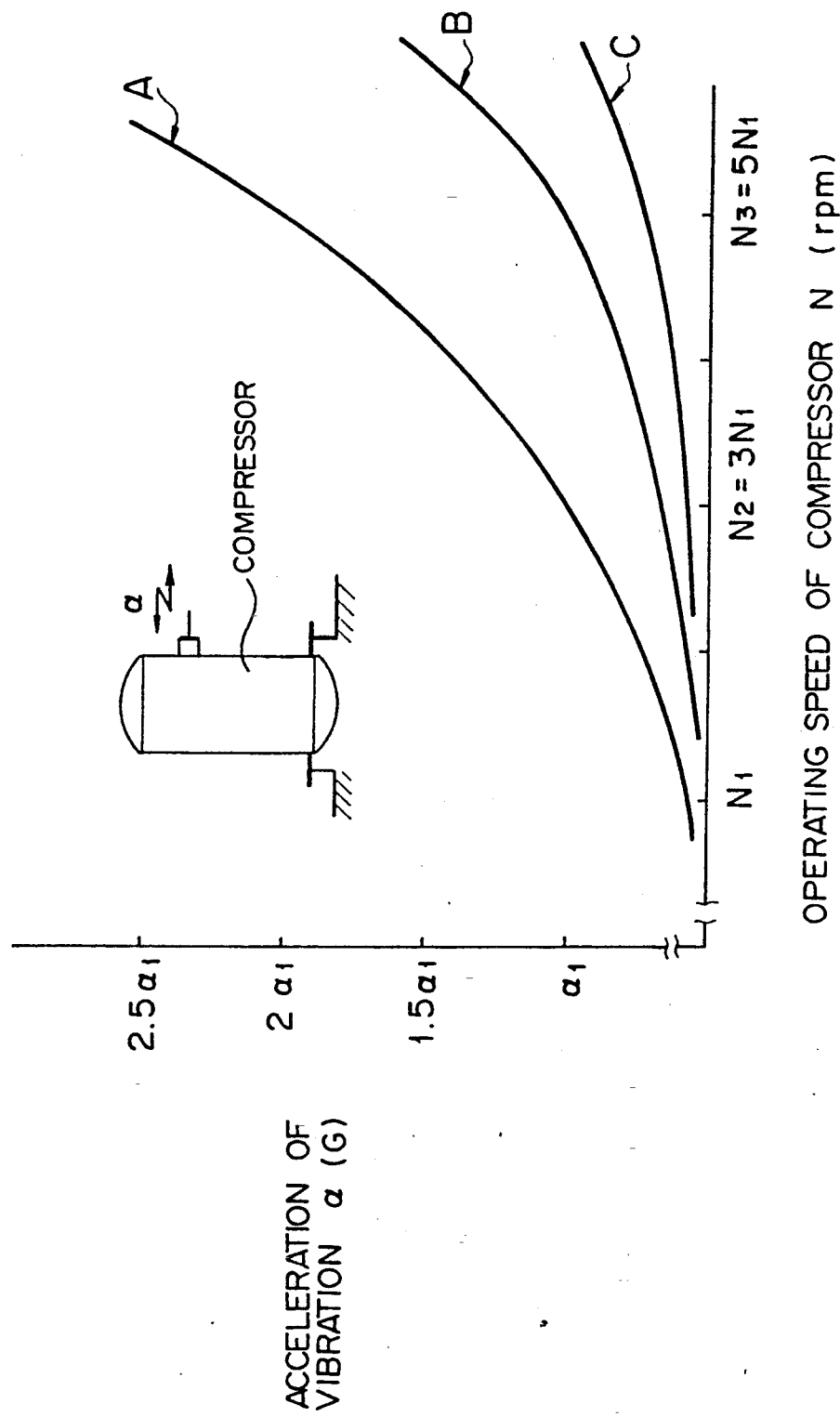

FIG. 8 shows the relative improvement in having the balance and counter weights in the scroll compressor of the invention, as compared to that of a conventional scroll compressor. In FIG. 8, the horizontal axis represents the operating speed of each scroll compressor, and the vertical axis represents the acceleration of vibration in the horizontal direction of the same. Further, curve A in the drawing represents the respective maximum vibration levels in the conventional scroll compressor at different operating speeds. Curve B represents the respective maximum vibration levels at different operating speeds in the scroll compressor according to the invention in which only the improvement is in having the balance and counter weights. As can be seen from this drawing, the vibration level represented by Curve B is lower, approximately by half, than that represented by Curve A, which means the maximum vibration level in the scroll compressor of the invention at each operating speed is lower than that in the conventional scroll compressor approximately by half. If, in addition to the improvement in the balance and counter weights, the weight of the Oldham ring is reduced, the vibration level in the compressor can be lowered to the level represented by Curve C, which is still lower than that represented by Curve B.

In the above-described structure the outer periphery of the self-aligning bearing 7c, which is provided on the side of the motor remote from the orbiting scroll, is formed in a spherical shape, so that it can freely change its attitude within the bearing housing 21 or 121. Thus, when assembling the compressor, if a slight misalignment is caused between the axis of the hermetic container and that of the crankshaft 6, or if, during operation, the crankshaft 6 is subjected to the centrifugal forces of the orbiting scroll 2 and the balance weight 4 to be deformed, the bearing 7c can change its attitude by virtue of its self-aligning function thereby always keeping a parallel relationship between the crankshaft 6 and the inner cylindrical portion of the bearing for receiving the crankshaft. Generally speaking, it is technically very difficult to perfectly compensate for the unbalance caused by the rotation of a crankshaft, and some unbalance force remains inevitably. If, however, the motor is driven at a high speed of 5,000 r.p.m. or more, as in the case where it is driven through an inverter, i.e., a device for changing its speed, such an unbalance will cause a larger force to be applied to the crankshaft, thereby bending it. According to the invention, even in such a condition, the deformation of the crankshaft 6 is kept at a low level by virtue of the bearing housing 21 or 121. Further, since the self-aligning bearing 7c can appropriately change its attitude in accordance with any slight deformation of the crankshaft 6, the crankshaft 6 can be supported by this bearing in a condition where only little local contact therebetween occurs. This also results in mitigating the local contact of the main bearing 7a with the crankshaft 6, thus keeping the bearings at a high level of reliability even when the compressor is being operated at high speed.

While the invention has been described with reference to preferred embodiments thereof, the invention is not limited solely to these specific forms, and it is possible to make various changes or adopt other forms within the scope of the appended claims. For example, although all the above embodiments have been described to be the hermetic type scroll compressors, it will be appreciated that the improvement of the invention can be applied also to a scroll compressor which is not of a hermetic type.

What is claimed is:

1. A scroll compressor comprising: a stationary and an orbiting scroll each having a spiral wrap, the respective spiral wraps of said stationary and orbiting scrolls meshing each other to define compression chambers therebetween; means for driving said orbiting scroll; crankshaft means for operatively connecting said driving means to said orbiting scroll to cause said orbiting scroll to make an orbiting motion; at least two bearing means respectively arranged on both sides of said driving means for rotatably supporting said crankshaft means, wherein the bearing means which is the most remotely distanced from said orbiting scroll has a self-aligning function of changing attitude in accordance with inclination of said crankshaft means; and bearing holder for supporting said bearing means which is most remotely distanced from said orbiting scroll, wherein said bearing holder is composed of two parts which, in cooperation with each other, define an inner peripheral surface of said bearing holder, said two parts are jointed together so that the resulting inner peripheral surface provides a fitted condition to the outer peripheral surface of the most remotely distanced bearing means, and wherein the most remotely distanced bearing means rotates at an outer peripheral surface thereof, upon a change in attitude thereof, with respect to the inner peripheral surface of said bearing holder.

2. A scroll compressor comprising: a stationary and an orbiting scroll each having a spiral wrap, the respective spiral wraps of said stationary and orbiting scrolls meshing each other to define compression chambers therebetween; means for driving said orbiting scroll; crankshaft means for operatively connecting said driving means to said orbiting scroll to cause said orbiting scroll to make an orbiting motion; at least two bearing means respectively arranged on both sides of said driving means for rotatably supporting said crankshaft means, wherein the bearing means which is the most remotely distanced from said orbiting scroll is a slidling bearing and has a self-aligning function of changing attitude in accordance with inclination of said crankshaft means; and a bearing holder for supporting said sliding bearing;

wherein said bearing holder is composed of two parts which, in cooperation with each other, define an inner peripheral surface of said bearing holder, said two parts are jointed together so that the resulting inner peripheral surface provides a fitted condition to the outer peripheral surface of said sliding bearing; and wherein said sliding bearing rotates with the outer peripheral surface thereof sliding on the inner peripheral surface of said bearing holder.

3. A scroll compressor according to claim 2, wherein each of said two bearing means is comprised of a sliding bearing.

4. A scroll compressor according to claim 2, wherein said sliding bearing has a spherical outer peripheral surface, through which said bearing is rotatably supported by said bearing holder.

5. A scroll compressor comprising: a stationary and an orbiting scroll each having a spiral wrap, the respective spiral wraps of said stationary and orbiting scrolls meshing each other to define compression chambers therebetween; means for driving said orbiting scroll; crankshaft means for operatively connecting said driving means to said orbiting scroll to cause said orbiting scroll to make an orbiting motion; at least two bearing means respectively arranged on both sides of said driving means for rotatably supporting said crankshaft means, wherein the bearing means which is the most remotely distanced from said orbiting scroll has a self-aligning function of changing attitude in accordance with inclination of said crankshaft means; a common casing in which said stationary scroll and said driving means are mounted; and a separate bearing housing which is fixed to said common casing,
  wherein said bearing means which is most remotely distanced from said orbiting scroll is mounted to said bearing housing and is comprised of a self-aligning type sliding bearing which has a spherical outer peripheral surface and which is rotatably supported by a bearing holder,
  wherein said bearing holder is composed of two parts which, in cooperation with each other, define an inner peripheral surface for receiving the spherical outer peripheral surface of said sliding bearing, said two parts are attached to said bearing housing and are integrally joined together so that the resulting inner peripheral surface provides a fitted condition to the outer peripheral surface of said sliding bearing, and
  wherein, in the fitted condition, said sliding bearing is tightened by said bearing holder and a change in attitude thereof is effected, thereby resulting in the outer peripheral surface of said sliding bearing sliding on the inner peripheral surface of said bearing holder, when an external force larger than a tightening force of said bearing holder is applied to said sliding bearing from said crankshaft means.

6. A scroll compressor according to claim 5, wherein said casing forms a hermetic container.

7. A scroll compressor according to claim 6, wherein said hermetic container is of a vertical type in which said crankshaft means is extended in a substantially vertical direction.

8. A scroll compressor according to claim 6, wherein said hermetic container is of a horizontal type in which said crankshaft means is extended in a substantially horizontal direction.

9. A scroll compressor comprising: a stationary and an orbiting scroll each having a spiral wrap, the respective spiral wraps of said stationary and orbiting scrolls meshing each other to define compression chambers therebetween; means for driving said orbiting scroll; crankshaft means for operatively connecting said driving means to said orbiting scroll to cause said orbiting scroll to make an orbiting motion; at least two bearing means respectively arranged on both sides of said driving means for rotatably supporting said crankshaft means, wherein the bearing means which is the most remotely distanced from said orbiting scroll has a self-aligning function of changing attitude in accordance with inclination of said crankshaft means; a rotation preventing means operatively engaged with said orbiting scroll for preventing rotation of said orbiting scroll about its own axis; and weight means attached to said crankshaft means for compensating for external forces applied to said crankshaft means, said weight means being provided to counterbalance a centrifugal force produced by said orbiting scroll and an inertial force produced by said rotation preventing means,
  wherein said rotation preventing means includes an Oldham ring,
  wherein said weight means comprises a balance weight and a counter weight which are fixed to said crankshaft means, respectively, and
  wherein said balance and counter weights are formed and arranged such that said balance weight has an unbalance mass which is a sum of an unbalance mass for generating a centrifugal force substantially equal to the centrifugal force generated by the orbiting movement of said orbiting scroll and an unbalance mass for generating a centrifugal force substantially equal to an average of the reciprocative inertial force generated by a reciprocating movement of said Oldham ring, and that said counter weight has an unbalance mass which counterbalances the centrifugal force generated by the unbalance mass of said balance weight.

10. A scroll compressor according to claim 9, wherein said balance weight is situated between said orbiting scroll and said driving means, and said counter weight is situated on an opposite side of said balance weight with respect to a longitudinal direction of said crankshaft means with said driving means interposed therebetween.

11. A scroll compressor according to claim 10, wherein said balance and counter weights are situated opposite to each other with respect to an axis of said crankshaft means.

12. A scroll compressor according to claim 9, wherein said Oldham ring is made lightweight to diminish the inertial force thereof.

13. A scroll compressor according to claim 12, wherein said Oldham ring is formed of an aluminum alloy.

14. A scroll compressor comprising: a stationary scroll having an end plate and a spiral wrap attached thereto; an orbiting scroll having an end plate and a spiral wrap attached thereto, the spiral wrap of said orbiting scroll being confronted by and meshing with the spiral wrap of said stationary scroll; electric motive means for driving said orbiting scroll; crankshaft means for connecting said electric motive means to said orbiting scroll to cause said orbiting scroll to make an orbital motion along a circular orbit; a rotation preventing means for preventing rotation of said orbiting scroll about an axis thereof to allow the orbital motion of said orbiting scroll; at least two bearing means respectively arranged on both sides of said electric motive means for rotatably supporting said crankshaft means, the bearing means which is the most remotely distanced from said orbiting scroll having a self-aligning function for changing attitude thereof in accordance with inclination of said crankshaft means to avoid local contact of said bearing means with said crankshaft means; and a weight means engaged with said crankshaft means for applying a force counterbalancing a centrifugal force generated by said orbiting scroll and an inertial force generated by said rotation preventing means to said crankshaft means, wherein said rotation preventing means includes an Oldham ring, said weight means comprises a balance weight attached to said crankshaft means and a counter weight attached to said crankshaft means in opposition to said balance weight, said balance and counter weights are formed and arranged such that said balance weight has an unbalance mass which is a sum of an unbalance mass for generating a centrifugal force substantially equal to the centrifugal force generated by the orbital motion of said orbiting scroll and an unbalance mass for generating a centrifugal force substantially equal to an average of the reciprocative inertial force generated by a reciprocating movement of said Oldham ring, and that said counter weight has an unbalance mass which counterbalances the centrifugal force generated by the unbalance mass of said balance weight.

15. A scroll compressor according to claim 14, further comprising a common casing in which said stationary scroll and said electric motive means are mounted; and a separate bearing housing fixed to said common casing, wherein said bearing means which is most remotely distanced from said orbiting scroll being attached to said bearing housing.

16. A scroll compressor according to claim 14, wherein both of said bearing means respectively comprise sliding bearings, the sliding bearing which is most remotely distanced from said orbiting scroll has a spherical outer peripheral surface and is rotatably supported by a bearing holder through said outer peripheral surface, said bearing holder is composed of two parts which, in cooperation with each other, define an inner peripheral surface that is in conformity with the outer peripheral surface of said sliding bearing, and said two parts are integrally jointed together so that the resulting inner peripheral surface provides a fitted condition to said outer peripheral surface of said sliding bearing.

17. A scroll compressor according to claim 16, wherein said sliding bearing which is most remotely distanced from said orbiting scroll is tightened, in the fitted condition, by said bearing holder to retain attitude thereof, and rotates with respect to said bearing holder to change the attitude thereof when an external force larger than a tightening force of said bearing holder is applied to said sliding bearing as a result of inclination of said crankshaft means.

* * * * *